United States Patent
Majas et al.

(10) Patent No.: US 10,842,132 B2
(45) Date of Patent: Nov. 24, 2020

(54) LONG RANGE WIRELESS MONITORING SYSTEMS WITH PREDETERMINED TRANSMISSION AND RECEPTION DURATIONS

(71) Applicant: Australian Wool Innovation Limited, The Rocks (AU)

(72) Inventors: Margus Majas, The Rocks (AU); Pollapee Sroysuwan, The Rocks (AU)

(73) Assignee: Australian Wool Innovation Limited, The Rocks (AU)

( * ) Notice: Subject to any disclaimer, the term of this patent is extended or adjusted under 35 U.S.C. 154(b) by 0 days.

(21) Appl. No.: 16/618,882

(22) PCT Filed: Jun. 6, 2018

(86) PCT No.: PCT/AU2018/050564
§ 371 (c)(1),
(2) Date: Dec. 3, 2019

(87) PCT Pub. No.: WO2018/223189
PCT Pub. Date: Dec. 13, 2018

(65) Prior Publication Data
US 2020/0163312 A1  May 28, 2020

(30) Foreign Application Priority Data

Jun. 7, 2017 (AU) .............................. 2017100671
Jun. 7, 2017 (AU) .............................. 2017902180

(51) Int. Cl.
*A01K 29/00* (2006.01)
*A01K 11/00* (2006.01)

(52) U.S. Cl.
CPC .......... *A01K 29/005* (2013.01); *A01K 11/006* (2013.01)

(58) Field of Classification Search
CPC ... A01K 29/005; A01K 11/006; A01K 11/004
See application file for complete search history.

(56) References Cited

U.S. PATENT DOCUMENTS

| 2007/0008150 A1 | 1/2007 | Hassell |
| 2008/0218357 A1 | 9/2008 | March et al. |

(Continued)

FOREIGN PATENT DOCUMENTS

| AU | 2016266101 B2 | 12/2016 |
| CN | 105145394 A | 12/2015 |

OTHER PUBLICATIONS

International Search Report issued in PCT/AU2018/050564, dated Aug. 21, 2018.

(Continued)

*Primary Examiner* — Hongmin Fan
(74) *Attorney, Agent, or Firm* — Locke Lord LLP

(57) ABSTRACT

A tag attachable to an animal, the tag comprising: a battery connected to a radio transceiver that consumes power from the battery during transmissions and receptions of signals to and from one or more proximate tags attachable to one or more other animals to generate paired tag readings; and a controller configured to operate the radio transceiver for a predetermined duration and frequency of transmissions, and a predetermined duration and frequency of receptions; wherein the predetermined duration and frequency of transmissions and the predetermined duration and frequency of receptions are based on power consumptions of the radio transceiver during transmissions and receptions, and a targeted number of paired tag readings of the tag.

5 Claims, 15 Drawing Sheets

(56) References Cited

U.S. PATENT DOCUMENTS

| | | | |
|---|---|---|---|
| 2011/0148639 A1 | 6/2011 | Geissler et al. | |
| 2011/0260858 A1 | 10/2011 | Eruchimovitch et al. | |
| 2015/0371068 A1* | 12/2015 | Sandell | G06K 19/0717 340/10.1 |
| 2017/0181401 A1* | 6/2017 | Lefevre | G01S 19/14 |
| 2017/0367305 A1* | 12/2017 | Castro Lisboa | A61D 19/00 |
| 2018/0295809 A1* | 10/2018 | Yajima | A01K 11/008 |

OTHER PUBLICATIONS

Examination Report No. 2 issued during the prosecution of corresponding Australian Patent No. 2017100671 on Jan. 10, 2018 (6 pages).

Examination Report No. 1 issued during the prosecution of corresponding Australian Patent No. 2017100671 on Aug. 22, 2017 (8 pages.).

\* cited by examiner

LONG RANGE WIRELESS MONITORING SYSTEMS WITH PREDETERMINED TRANSMISSION AND RECEPTION DURATIONS

CROSS REFERENCE TO RELATED APPLICATIONS

This application is a U.S. National Phase Application filed under 35 U.S.C. § 371, based on International PCT Patent Application No. PCT/AU2018/050564, filed Jun. 6, 2018, which application claims priority to Australian Patent Application No. AU 2017100671 filed on Jun. 7, 2017 and Australian Patent Application No. AU 2017902180 filed on Jun. 7, 2017. The entire contents of these applications are incorporated herein by reference in their entirety.

FIELD

The present invention relates to long range wireless monitoring systems for movable objects, such as animals.

BACKGROUND

Conventional long range wireless systems for monitoring geographically dispersed movable objects, such as animals, generally comprise GPS and satellite monitoring devices. Such wireless monitoring devices are expensive, heavy and require high power.

A need therefore exists for long range wireless monitoring systems that are low cost, low weight and low power.

SUMMARY

According to the present invention, there is provided a tag attachable to an animal, the tag comprising: a battery connected to a radio transceiver that consumes power from the battery during transmissions and receptions of signals to and from one or more proximate tags attachable to one or more other animals to generate paired tag readings; and a controller configured to operate the radio transceiver for a predetermined duration and frequency of transmissions, and a predetermined duration and frequency of receptions; wherein the predetermined duration and frequency of transmissions and the predetermined duration and frequency of receptions are based on power consumptions of the radio transceiver during transmissions and receptions, and a targeted number of paired tag readings of the tag.

The animal may be a sheep.

The predetermined duration and frequency of transmissions may be around 1 to 5 nanoseconds every 10 seconds.

The predetermined duration and frequency of receptions may be around 10 seconds every 10 minutes.

The targeted number of paired tags readings of the tag may be 100 per day.

BRIEF DESCRIPTION OF DRAWINGS

Embodiments of the invention will now be described by way of example only with reference to the accompanying drawings, in which.

DESCRIPTION OF EMBODIMENTS

Figure 1:
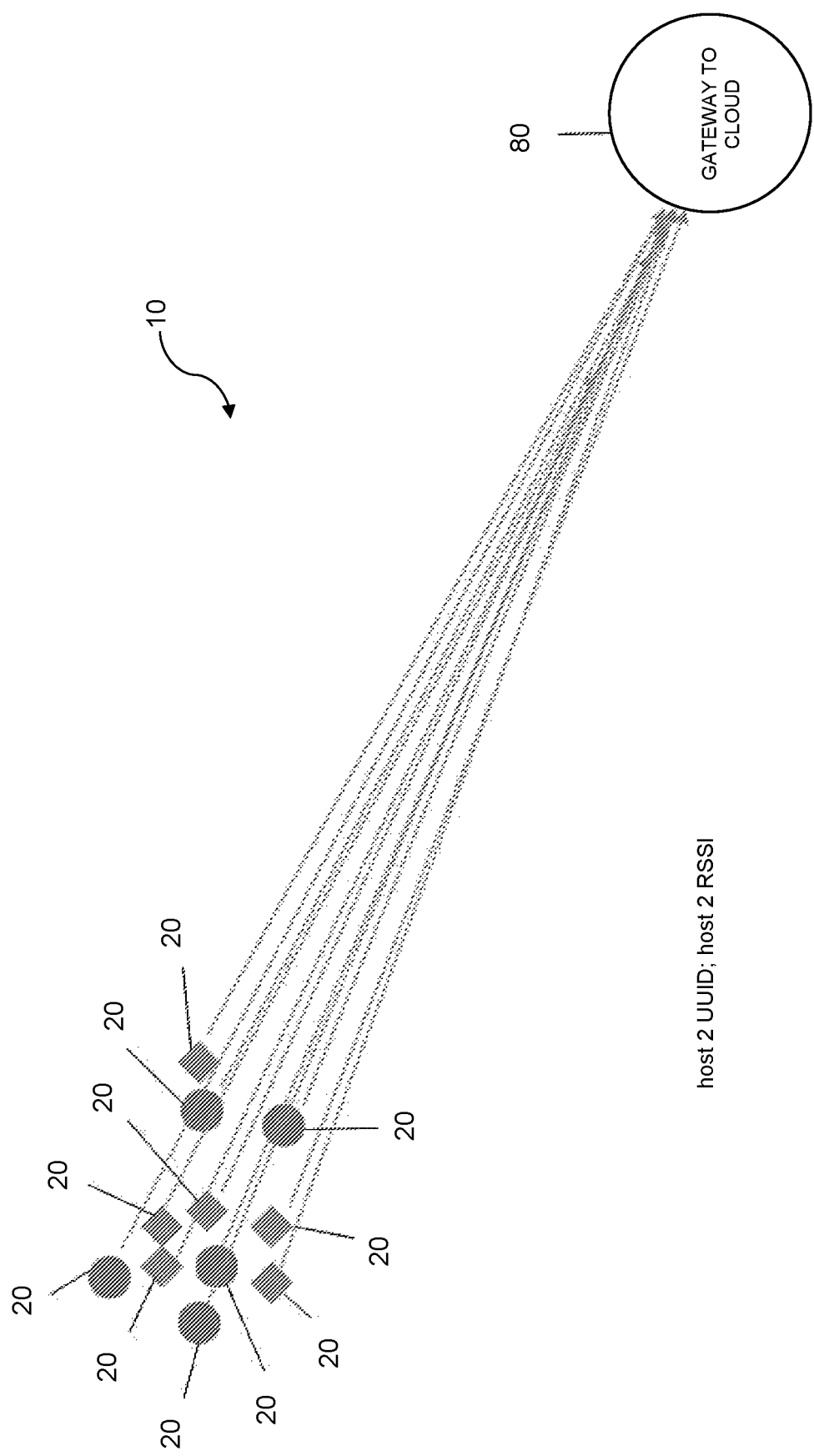
FIGS. 1 to 7 are schematic diagrams of example configurations of long range wireless monitoring systems for movable objects according to embodiments of the present invention.

Referring to FIG. 1, a wireless monitoring system 10 for movable objects (not shown) according to one embodiment of the present invention generally comprises tags 20 individually attachable to the movable objects (such as items, products or animals), and a gateway 80 to a server (not shown), such as a cloud server or a local server. The gateway 80 may wirelessly communicate with the server via a Wide Area Network (WAN) such as the Internet when the server is a cloud server, or via a Local Area Network (LAN) or a WiFi protocol when the server is a local server. The tags 20 may, for example, be individually attached to ewes and lambs. The tags 20 may be configured to individually or collectively communicate radio signals with any one of one or more neighbouring tags 20, and the gateway 80.

The tags 20 may be further configured to communicate the radio signals at frequencies from about 300 MHz to about 3 GHz. For example, the frequency may be about 2.4 GHz, from about 400 MHz to about 950 Mhz, or both. Furthermore, the tags 20 may be configured to communicate the radio signals using a long range, low power wireless communication protocol selected from DigiMesh, ZigBee, Bluetooth, Enhanced ShockBurst, Bluetooth 5, Bluetooth Low Energy, ultra-narrowband radio, Long Range WAN (LoRaWAN), and combinations thereof.

In the embodiment of the system 10 illustrated in FIG. 1, the tags 20 may individually transmit the radio signals to the gateway 80 directly. In other embodiments illustrated in FIGS. 2 to 7, the system 10 may further comprise readers 50 configured to individually or collectively communicate radio signals with any one of one or more neighbouring tags 20, one or more neighbouring readers 50, and the gateway 80. In these embodiments, the radio signals may be communicated to the gateway 80 via a wireless ad hoc network (WANET) or a wireless mesh network (WMN) comprising one or more tags 20 and/or one or more readers 50. Like the tags 20, the readers 50 may be further configured to communicate the radio signals at frequencies from about 300 MHz to about 3 GHz. For example, the frequency may be about 2.4 GHz, from about 400 MHz to about 950 Mhz, or both. Furthermore, the readers 50 may be configured to communicate the radio signals using a long range, low power wireless communication protocol. The long range, low power wireless communication protocol may be selected from DigiMesh, ZigBee, Bluetooth, Enhanced ShockBurst, Bluetooth 5, Bluetooth Low Energy, ultra-narrowband radio, Long Range WAN (LoRaWAN), and combinations thereof. Other equivalent long range, low power wireless communication protocol may alternatively be used.

The radio signals may comprise tag ID data (eg, a universally unique identifier (UUID)), signal strength data (eg, received signal strength indicator (RSSI)) of the radio signals received from one or more neighbouring tags 20 during the periodic reception intervals), paired tag data (eg, paired tag IDs, paired tag RSSI, frequency of pairing, duration of pairing, etc), reader ID data, reader location data, sensor data, and combinations thereof.

Depending on the configuration of the system 10, the radio signals may be communicated from the animals to the gateway 80 over distances from up to about 1 km (eg, Bluetooth 5, Bluetooth Low Energy), up to about 5 km (eg, DigiMesh or ZigBee), or to up to about 15 km (eg, ultra-narrowband radio). For example, the tags 20 may each have a range from up to about 1 km with a bit rate from about 125 kb per second to about 250 kb per second, to up to about 15 km with a bit rate of up to about 25 kb per second.

Figure 2:
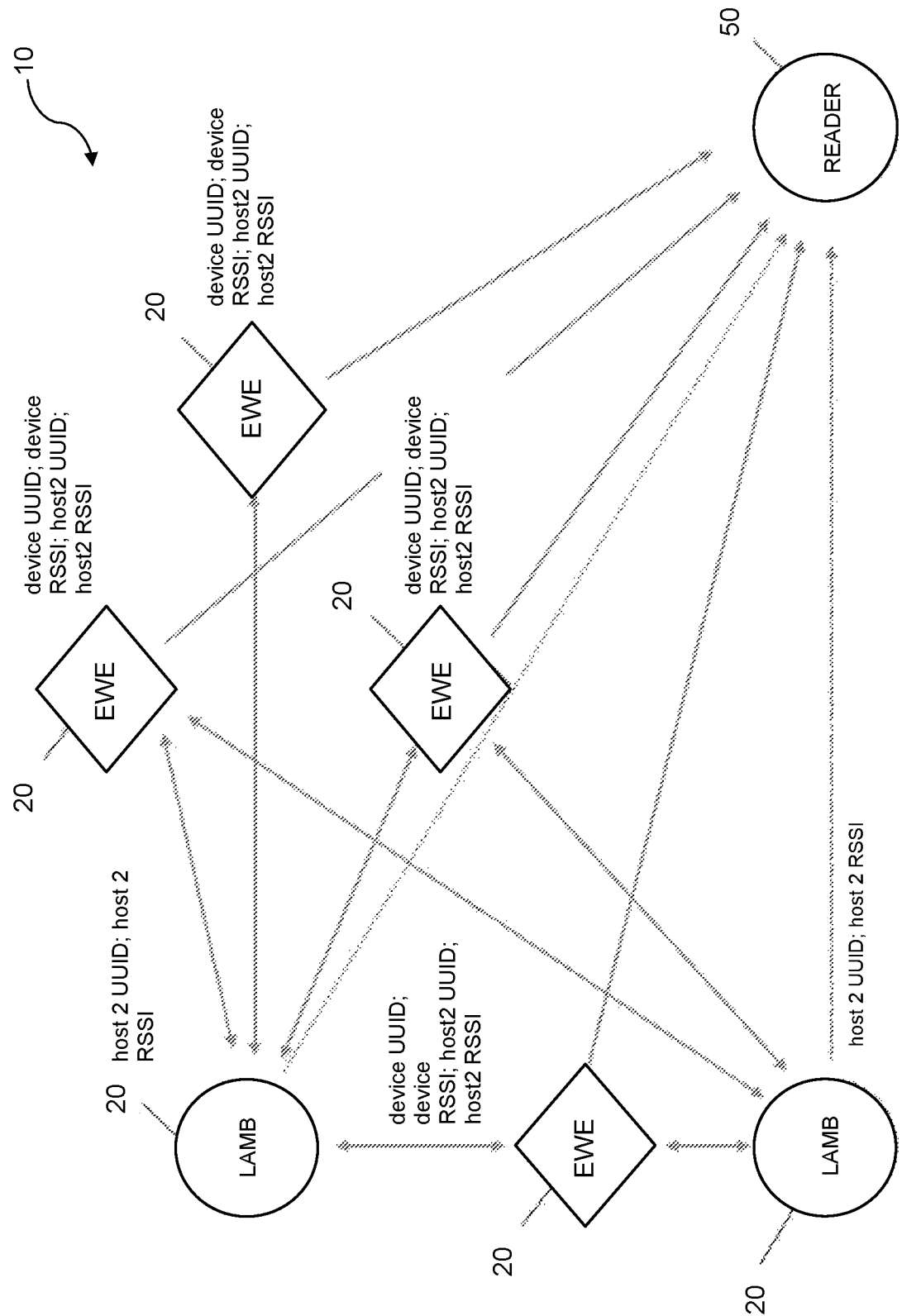
Figure 3:
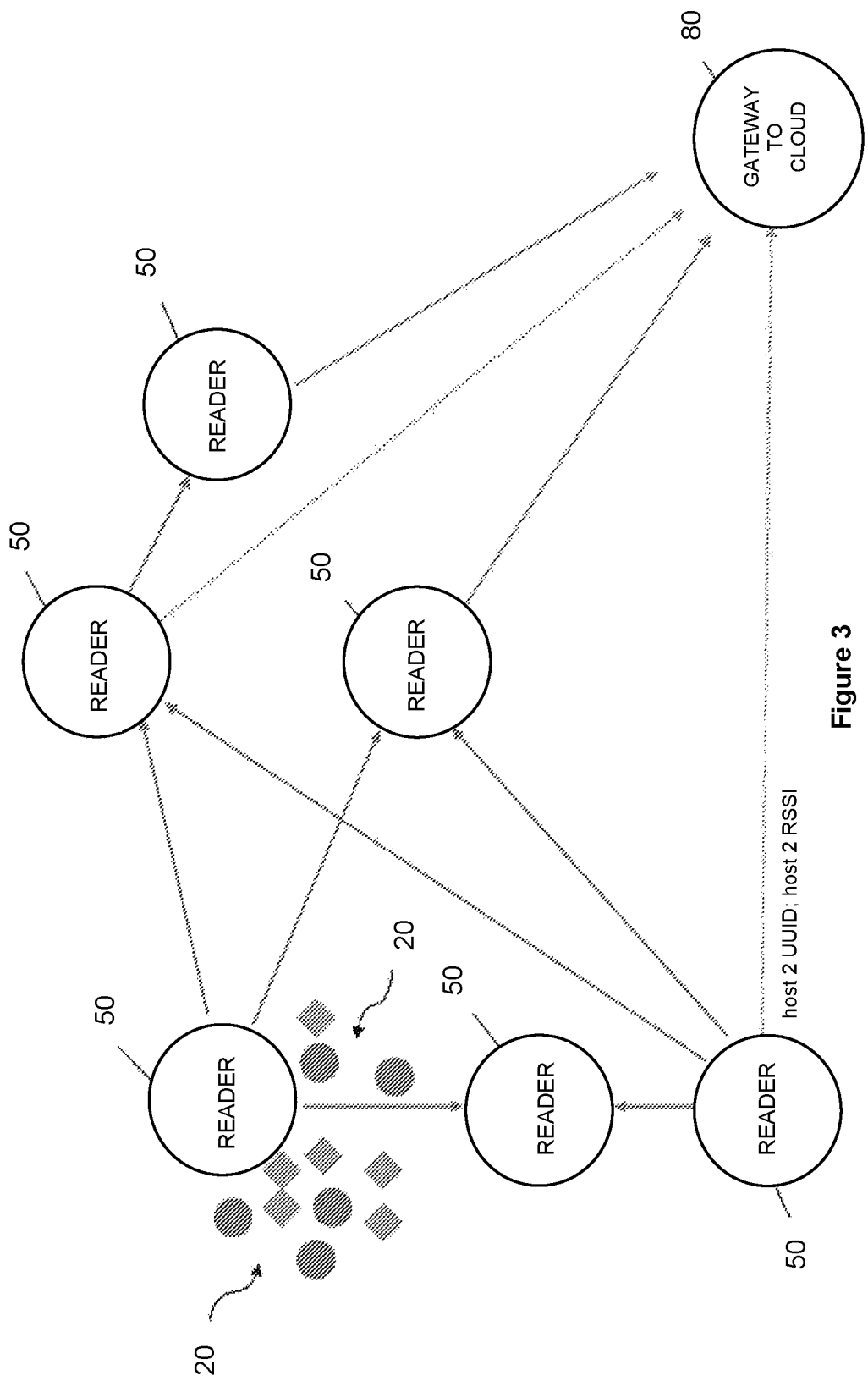

In one embodiment of the system 10 illustrated in FIGS. 2 and 3, the tags 20 may communicate their tag ID data and paired tag ID data to one or more neighbouring readers 50 (FIG. 2). The readers 50 may be configured to transmit the tag data received from the tags 20 to the gateway 80 via a WMN of readers 50 (FIG. 3).

Figure 4:
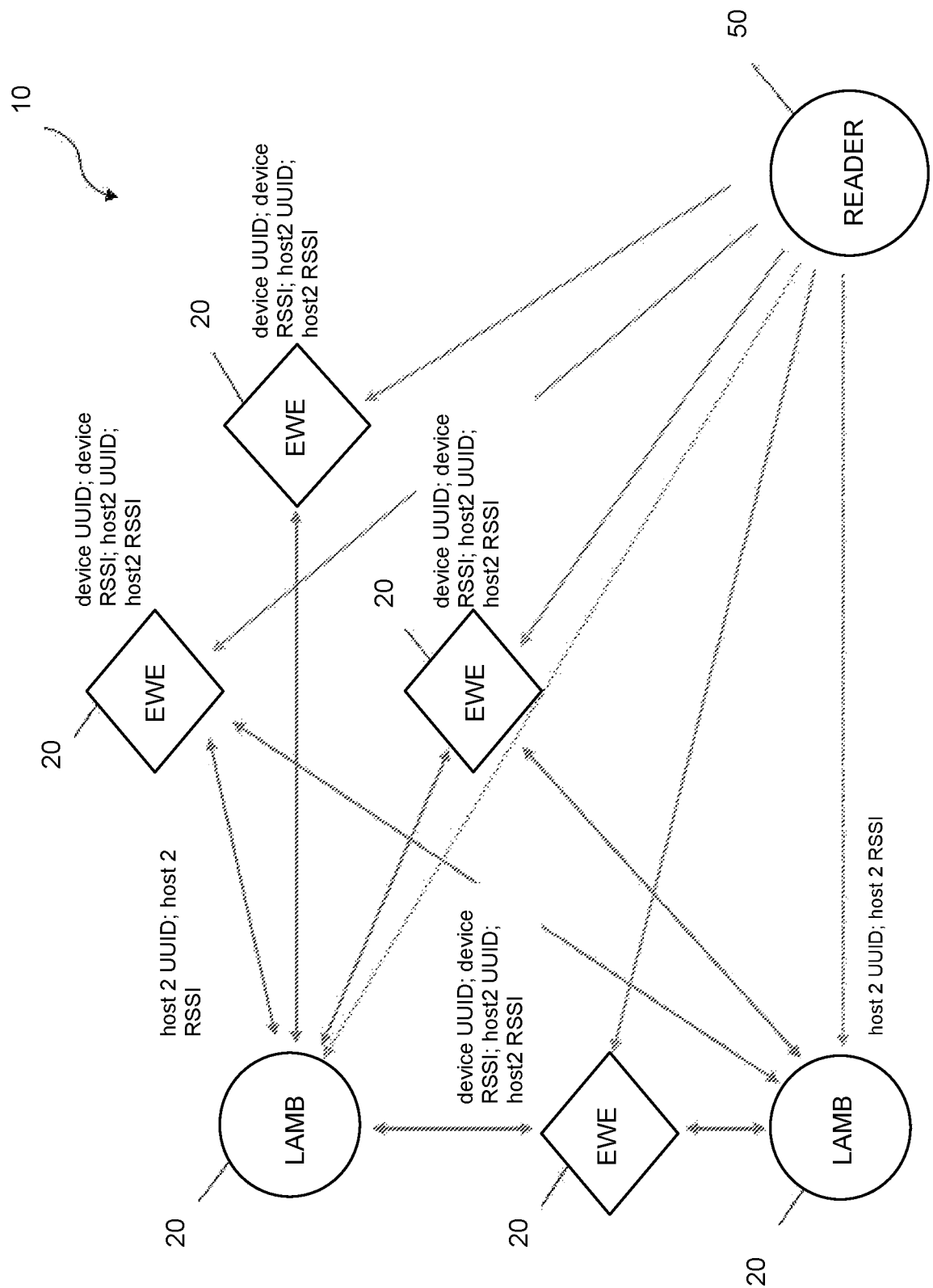
Figure 5:
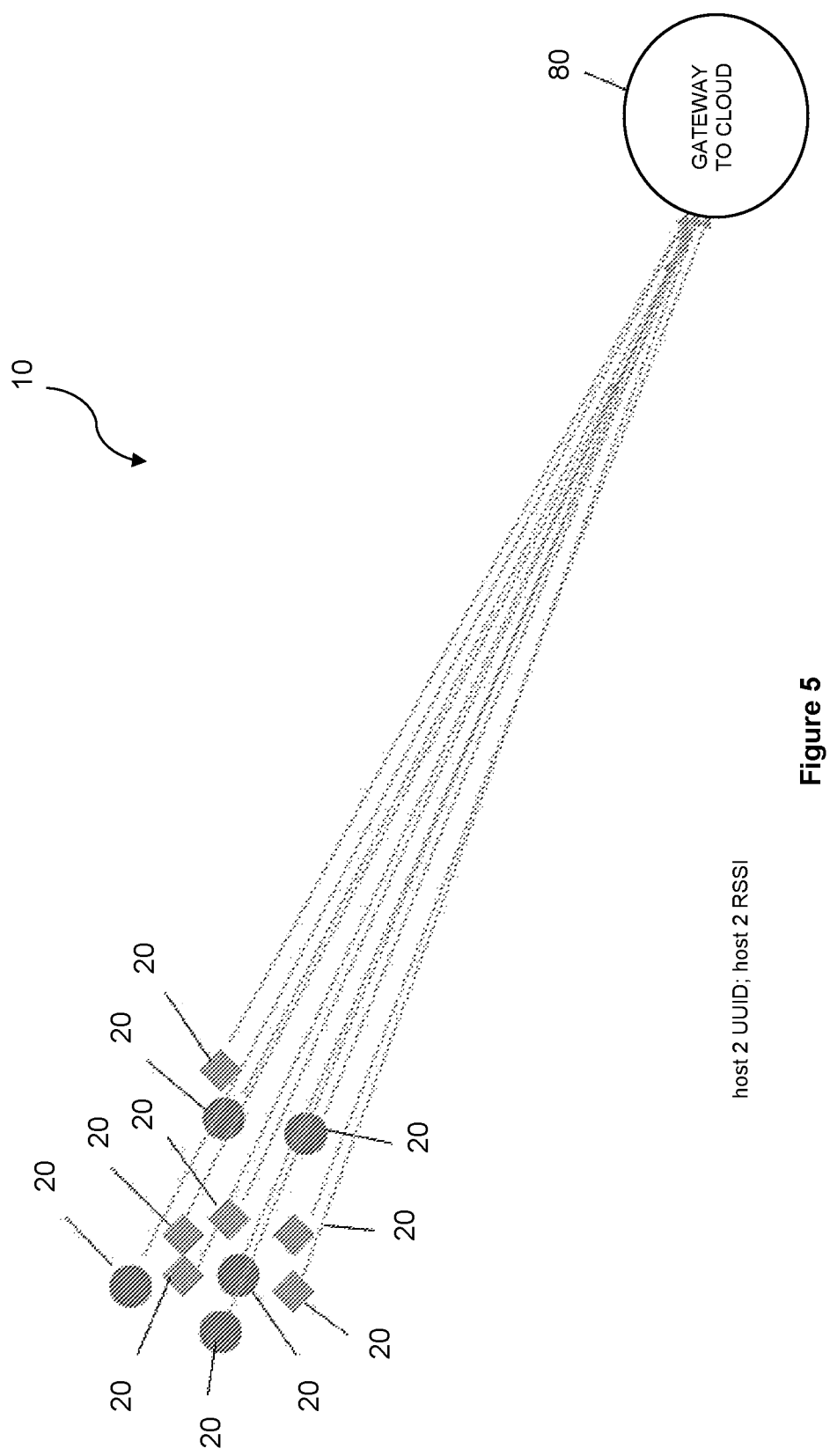

In another embodiment of the system 10 illustrated in FIGS. 4 and 5, the readers 50 may be stationary and individually associated with locations (eg, fences, gates, stock feeders, etc). The readers 50 may be configured to transmit their location data to the tags 20 (FIG. 4) which, in turn, may be configured to store and transmit the location data received from the stationary readers 50 to the gateway 80 (FIG. 5).

Figure 6:
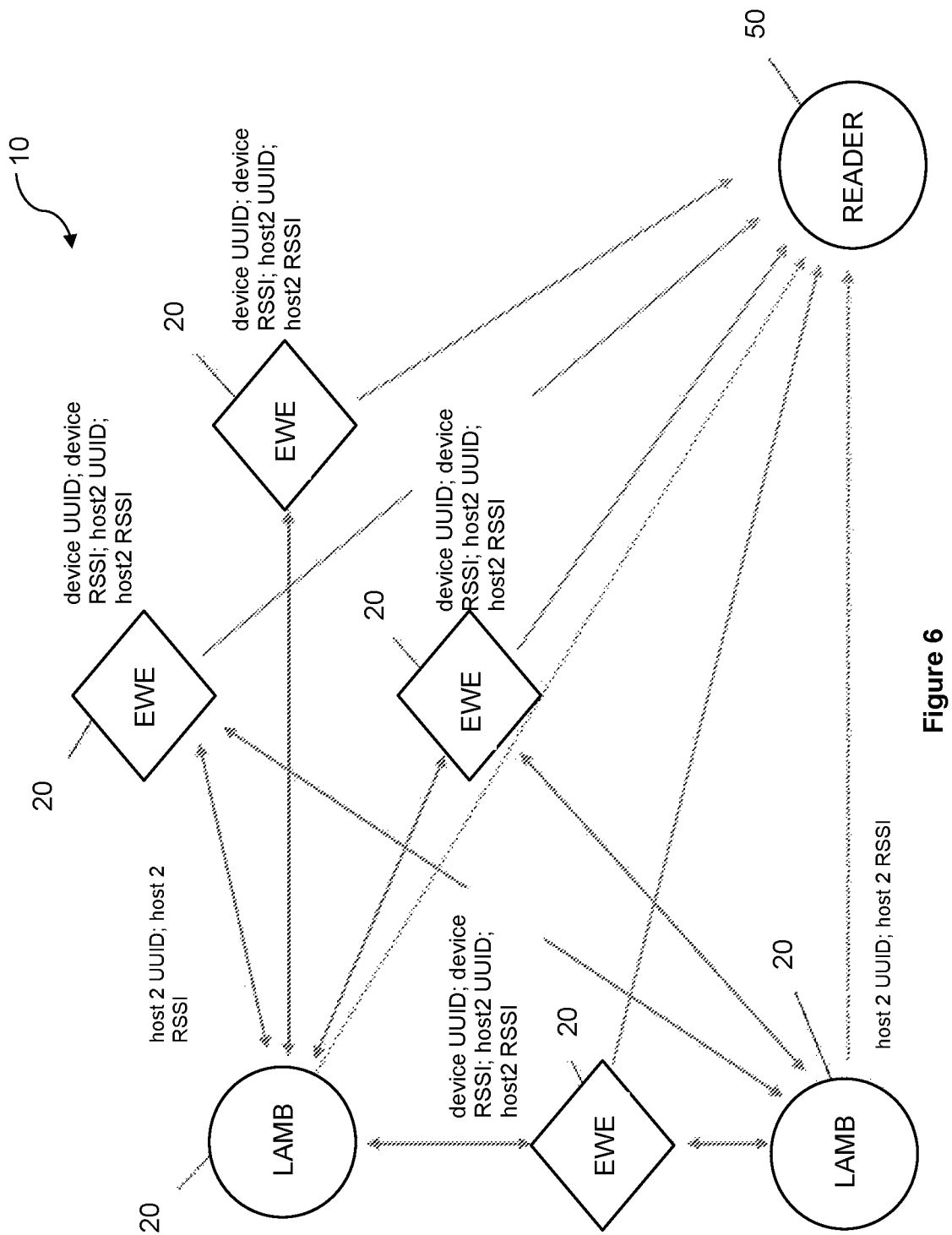
Figure 7:
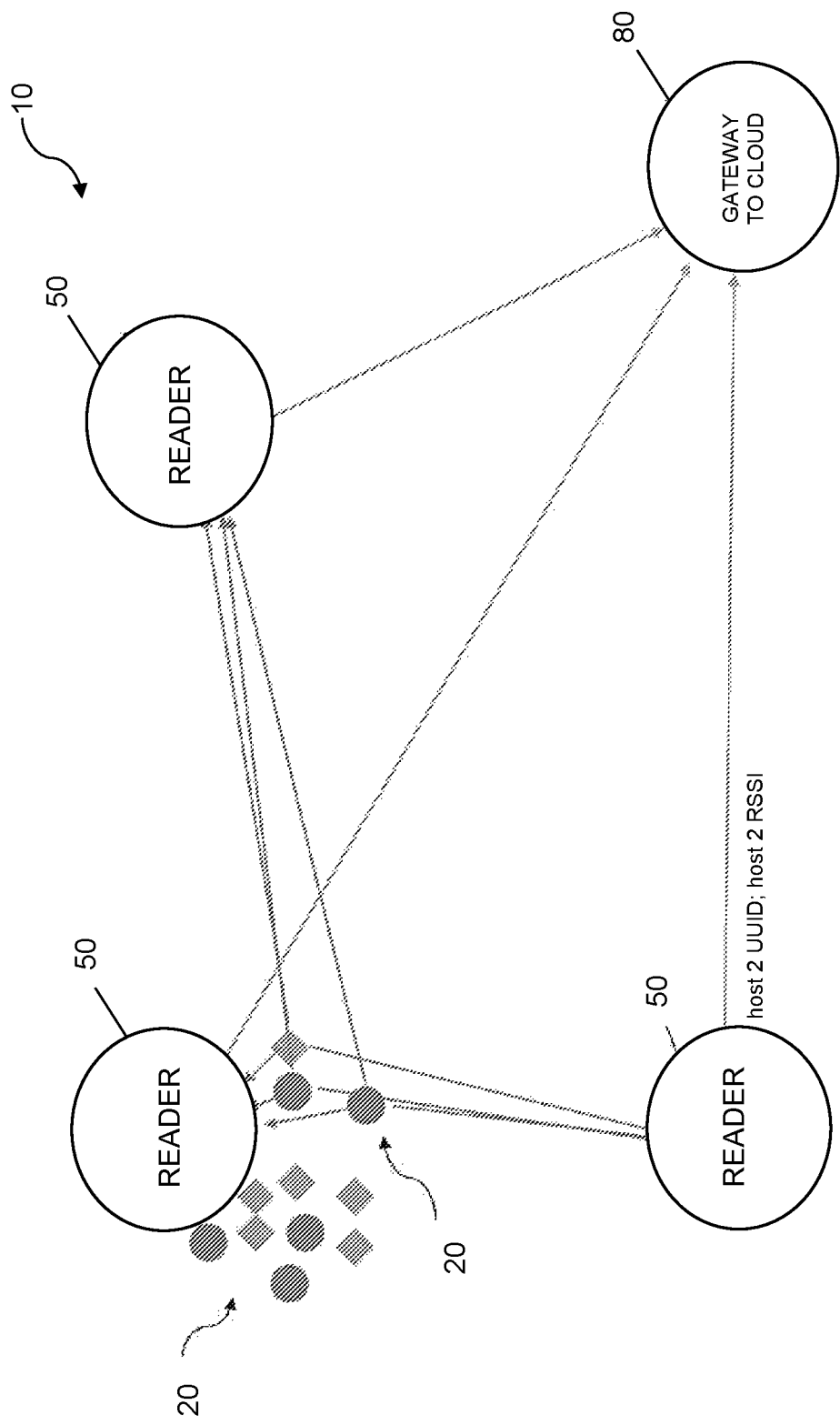

In a further embodiment of the system 10 illustrated in FIGS. 6 and 7, the tags 20 may communicate their tag ID data and paired tag ID data to one or more neighbouring readers 50 (FIG. 6) in similar fashion to the embodiment illustrated in FIG. 2. The readers 50 may, however, be alternatively configured from FIG. 3 to transmit the tag data received from the tags 20 to the gateway 80 directly (FIG. 7), and not via any WMN or WANET.

Figure 8:
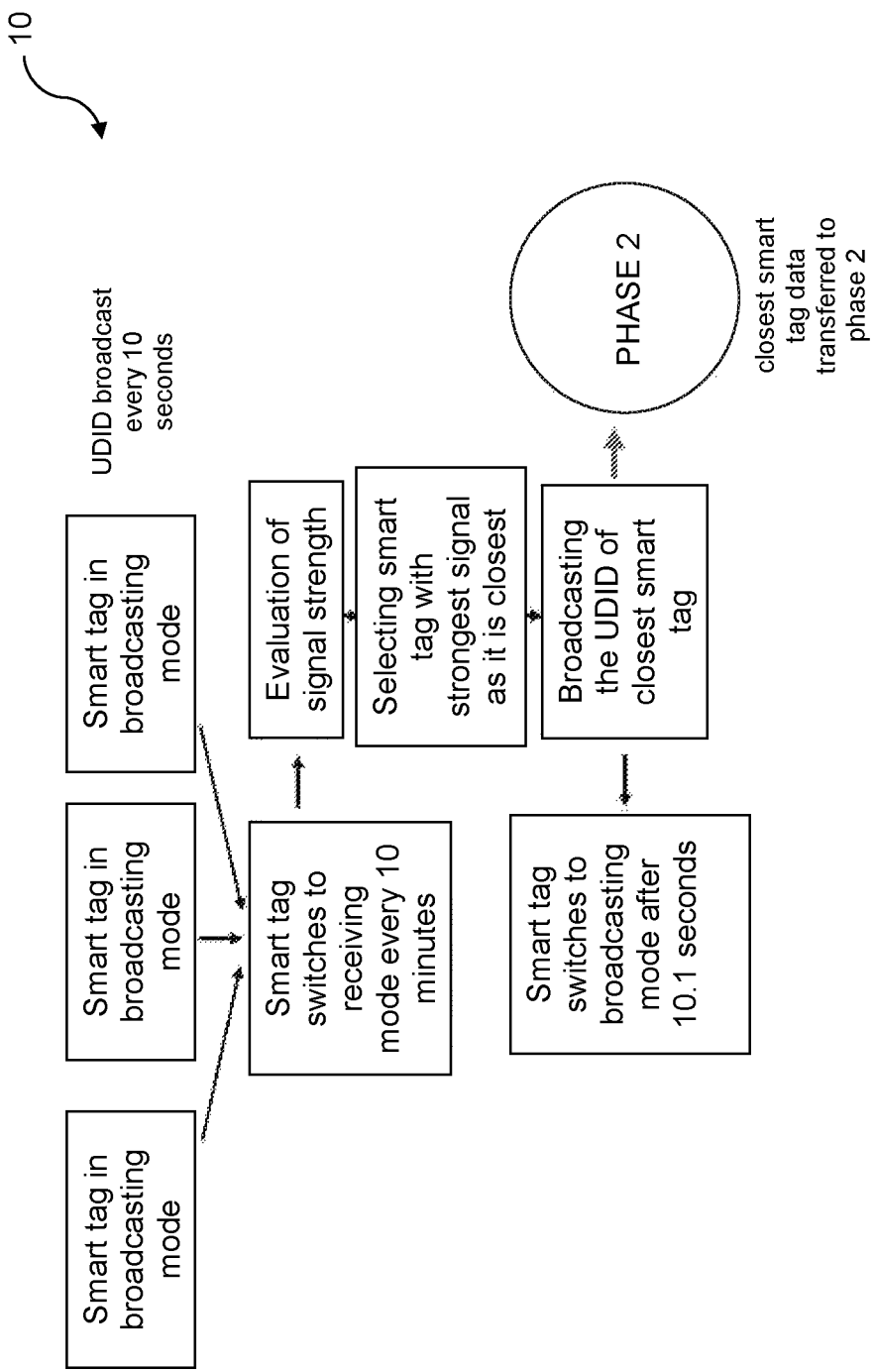
FIGS. 8 to 11 are example use cases of embodiments of the system.

Referring to FIG. 8, the tags 20 may be configured to communicate the radio signals based on periodic transmission intervals and periodic reception intervals. For example, the tags 20 may be configured to transmit and receive unique identification data with one or more neighbouring tags 20 during periodic transmission intervals and periodic reception intervals. Furthermore, the tags 20 may be further configured to pair with one or more neighbouring tags 20 having strongest signal strengths. The tags 20 may be further configured to store the tag ID data, paired tag data, and signal strength data, and to transmit the stored data to the readers 50 and/or the gateway 80 during the periodic transmission intervals.

The periodic transmission intervals and periodic reception intervals of the tags 20 may be selected, for example, by balancing power consumption (eg, significantly more power is consumed in receiver mode) and the effectiveness and utility of the captured data (eg, the more frequently tags 20 identify one or more paired tags 20, the more reliable and accurate the proximity data between tags 20 will be). For example, one variable that may be used to determine timing for how often tags 20 may transmit, and how often tags 20 may switch into receiver mode (after which a single transmission is sent), is a targeted number of paired tag readings of 100 per day for each tag 20. For example, the periodic transmission intervals may be around 1 to 5 nanoseconds every 10 seconds, and the periodic reception intervals may be around 10.1 seconds every 10 minutes.

The readers 50 may be stationary and may be individually associated with locations. The readers 50 may be configured to transmit their location data to one or more neighbouring tags 20 and/or to the gateway 80. For example, the readers 50 may define a virtual fence or geo-fence defining an area in which the animals are monitored. Each reader 50 may be configured to receive the tag IDs and signal strengths of the paired tags 20 from one or more neighbouring tags 20. Each reader 50 may be further configured to transmit radio signals comprising reader IDs, the tag IDs and signal strengths of the paired tags 20 to a server (not shown) via a WMN or WANET of one or more neighbouring readers 50. In other words, in some embodiments, the readers 50 may be configured for long range, low power reader-to-reader relaying of the tag IDs and signal strengths of the paired tags 20 to the server via the gateway 80. Like the tags 20, the readers 50 may be configured to transmit the radio signals comprising the tag IDs and signal strengths of the paired tags 20 to one or more neighbouring readers 50 and/or the gateway 80 at periodic transmission intervals, for example, around every 10 seconds.

Figure 9:
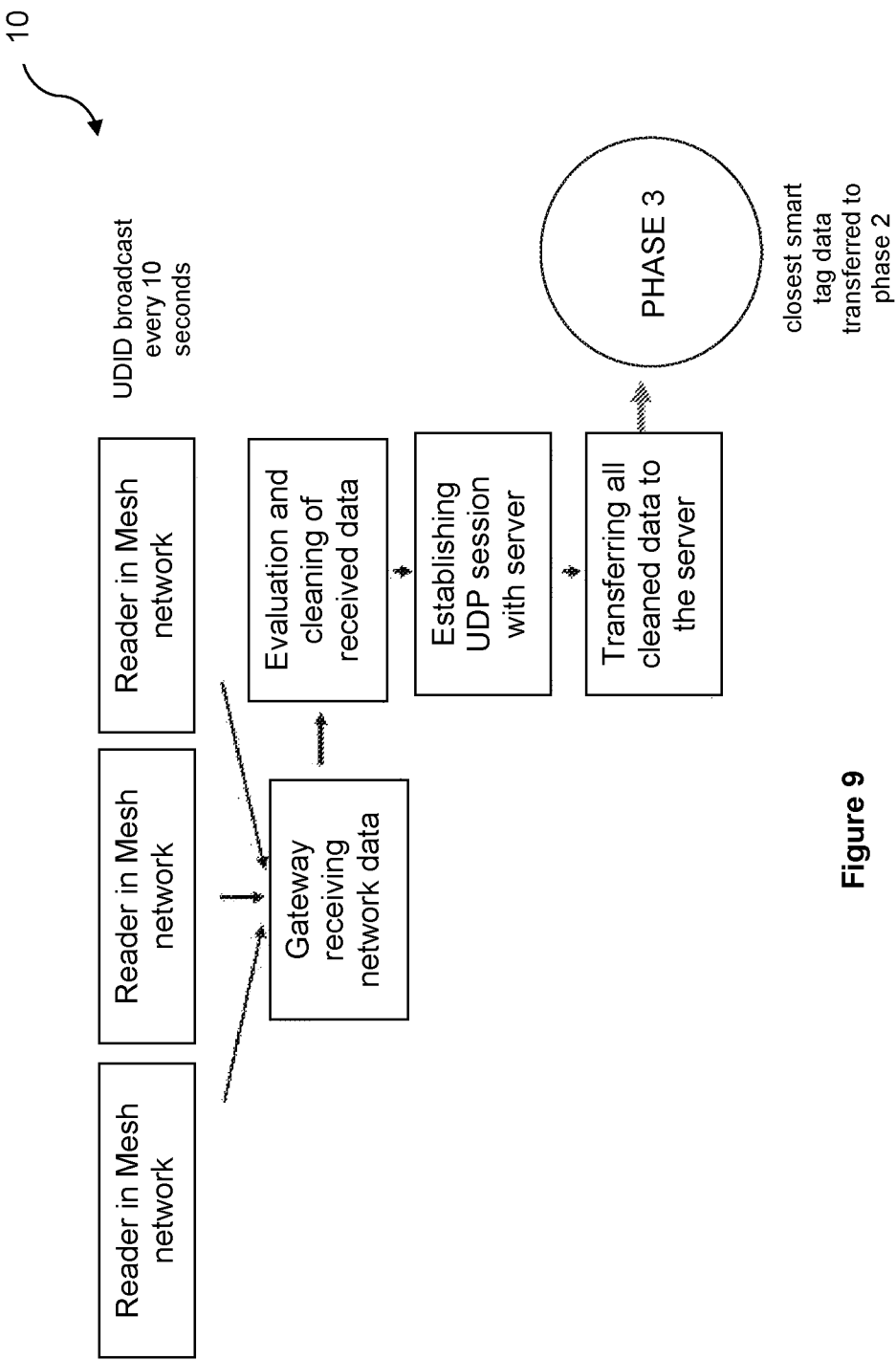

Referring to FIG. 9, the gateway 80 may receive data from the readers 50 and may be wirelessly connectable to the server via the internet. When the data from the readers 50 reaches the gateway 80, the gateway 80 may be programmed to clean the data by removing incomplete or erroneous data. The gateway 80 may complete this data cleaning before sending the cleaned data to the server. This reduces the amount of data being sent and the time required to clean the data at the server end.

The gateway 80 may be remotely programmed via the server to:
  only receive specific data from the tags 20 and/or readers 50;
  only send specific data to the server;
  change the configuration of the WANET OR WMN of readers 50, such as by adding an additional reader 50; and
  reprogram the firmware on the readers 50 in the WANET or WMN.

The UUIDs of individual readers 50 may be entered into the server and matched to a specific gateway 80 to ensure that the WMN or WANET of readers 50 (and therefore the gateway 80) only receives data from readers 50 specific to the system 10, and not readers 50 located nearby in a different system.

Figure 12:
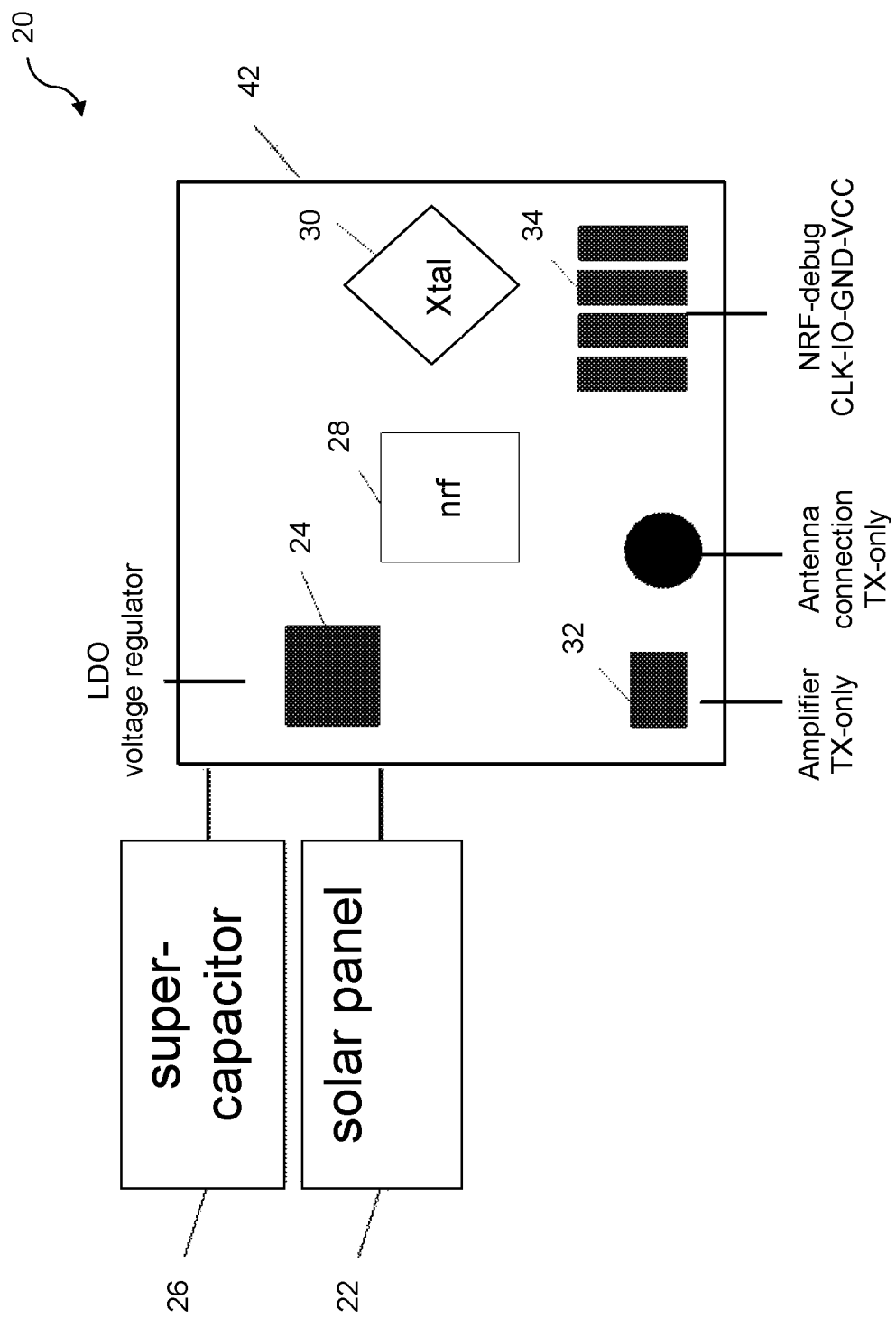
FIG. 12 is a functional block diagram of a tag of the system.

Referring to FIG. 12, the tags 20 may each comprise a solar panel 22, a low dropout (LDO) voltage regulator 24, a super capacitor 26, an ultra-high frequency (UHF) radio transceiver 28, a crystal oscillator 30, an amplifier 32, and a high frequency radio debug 34. The solar panel 22 may generate from around 1.8V to 3V up to around 5V. The LDO voltage regulator 24 may be selected to minimise voltage losses as it conserves more power than a normal voltage regulator. Power may be sent via the regulator 24 to the high frequency radio transceiver 28.

The super capacitor 26 may be selected to store power like rechargeable batteries, but unlike rechargeable batteries to charge almost instantly. Further, unlike rechargeable batteries, there are no issues with over or under charging. Further, the super capacitor 26 may be selected because it has no limits to the number of times it is recharged, so is a more durable option than rechargeable batteries.

The UHF radio transceiver 28 may comprise a wireless transceiver that operates at 2.4 GHz, such as a Nordic nRF transceiver. The Nordic nRF wireless transceiver may be selected because it uses the Enhanced ShockBurst wireless protocol which provides a reduced bit rate per second which in turn also greatly increases (quadruples) the range compared to current versions of the Bluetooth wireless protocol. Further, the Enhanced ShockBurst wireless protocol provides bespoke settings to be created for RF transmission and reception, such as decreasing the bit rate (eg, to around 250 kb per second), and managing the crystal oscillator 30 which gives transparency around how the crystal oscillator 30 is running and the ability to change its settings. The UHF radio transceiver 28 may also comprise a wireless transceiver that operates at 400 MHz to 950 Mhz frequencies such as MicroChip LoRa modules allowing for up to 15 km range at lower bitrates and shorter transmission intervals. Further the UHF radio transceiver 28 may comprise of both radio devices. The Bluetooth 5 Low Energy wireless protocol may have a similar range and bit rate as the Enhanced ShockBurst wireless protocol. If the functionality and power efficiency of the Bluetooth 5 Low Energy wireless protocol is similar to the Enhanced ShockBurst wireless protocol, then the Bluetooth 5 Low Energy wireless protocol may be a more suitable alternative low power wireless protocol because it will not need to be translated by a different piece of hardware in order to communicate with a mobile device such as a smart phone.

The crystal oscillator 30 may be selected because the high frequency radio transceiver 28 requires a high frequency oscillator to switch between transmission and reception modes. The high frequency radio transceiver 28 may control the crystal oscillator 30 to switch it between low and high frequency modes. When the crystal oscillator 30 is in high frequency mode it is then able to transmit. When the transmission signal has been sent, the high frequency radio transceiver 28 turns off the high frequency mode of the crystal oscillator 30, switching it back to low frequency mode so it becomes a receiver again. When transmitting at high frequency mode the crystal oscillator 30 may be operating at around 900 μA and when in resting/low frequency it may be operating at around 4 μA.

The amplifier 32 may help extend the range of the high frequency radio transceiver 28. It may consume more power in high frequency mode but this is balanced by a lower transmission frequency of the high frequency radio transceiver (eg, it may be programmed to transmit only every 10 seconds).

The high frequency radio debug 34 may allow the tags 20 to be programmed. Tags 20 are typically programmed at manufacture, but the debug 34 provides the ability to update or modify the programming manually to each tag 20 if required.

Figure 13:
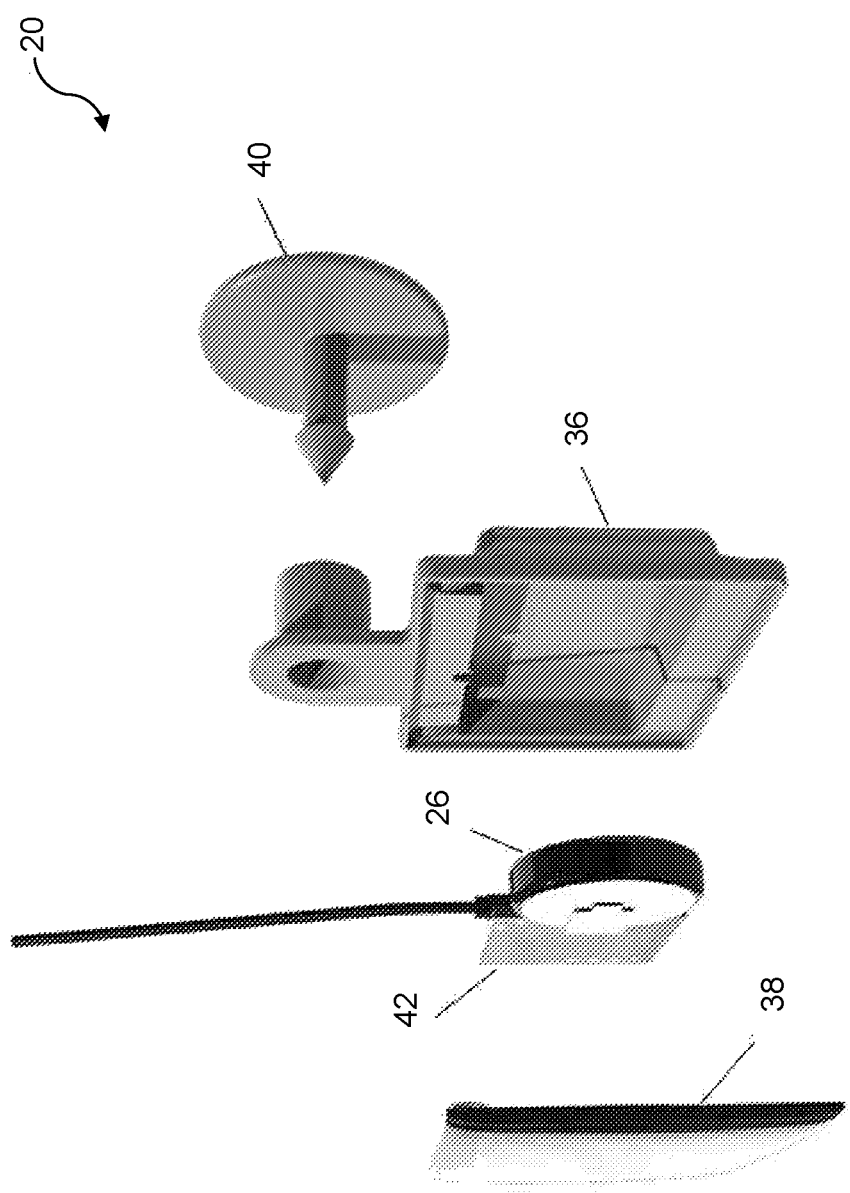
FIG. 13 is an exploded perspective view of the tag.

Referring to FIG. 13, the tags 20 may each generally comprise a housing 36, a housing cover 38 and an animal attachment member 40. The LDO voltage regulator 24, high frequency radio transceiver 28, crystal oscillator 30, amplifier 32, and high frequency radio debug 34 may be provided on a circuit board 42 housed in the housing 36. The super capacitor 26 and an antenna may be edge-mounted to one side of the circuit board 42. The solar panel 22 may be provided on the housing cover 38. Optionally, the tags 20 may comprise one or more on-board sensors (not shown) for example, accelerometer, temperature sensor, barometer, etc, which can be used to monitor animal behaviour parameters and environmental variables.

Figure 14:
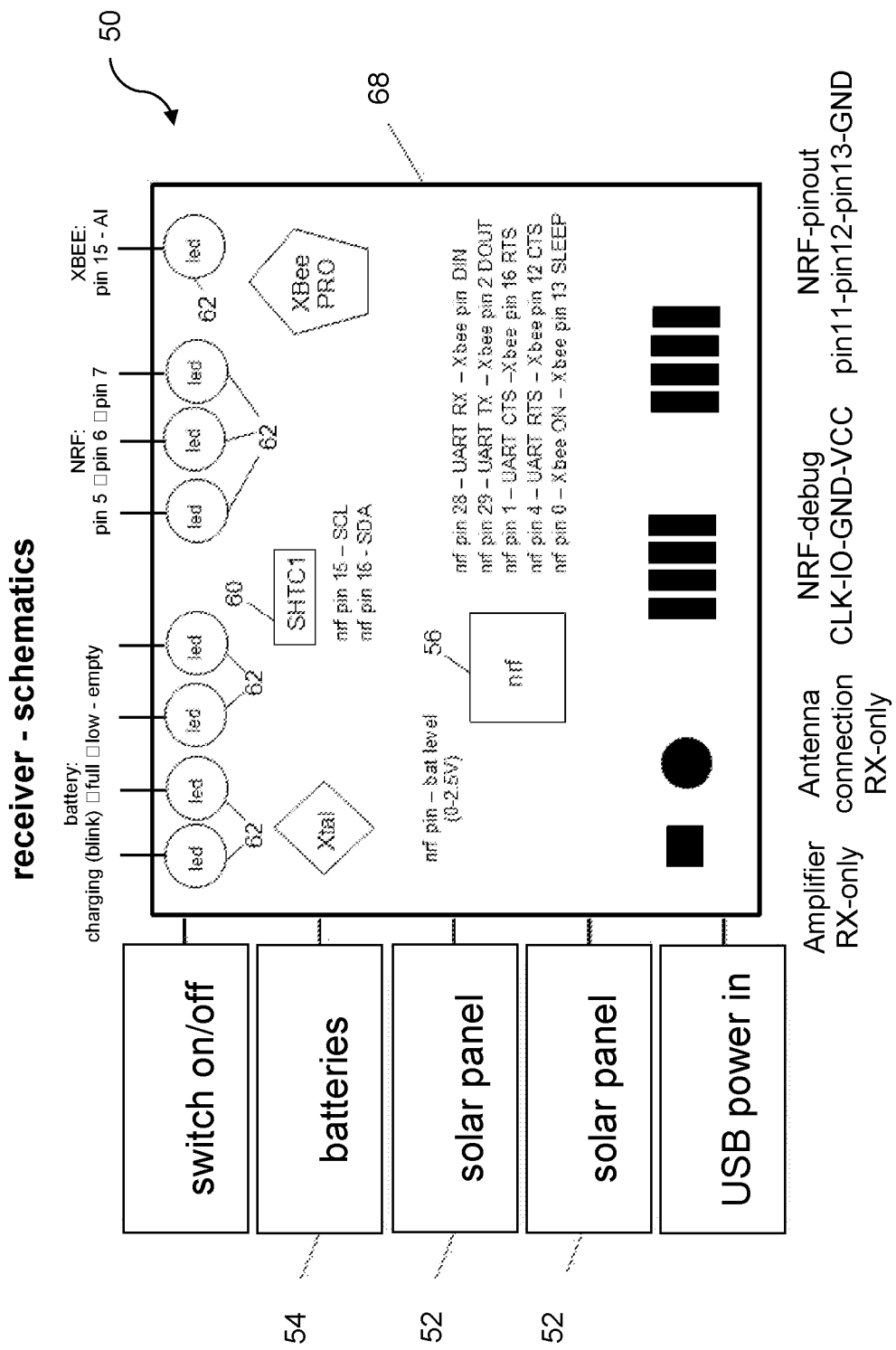
FIG. 14 is a functional block diagram of a reader of the system.

Referring to FIG. 14, the readers 50 may each comprise one or more solar panels 52, batteries 54, and two UHF radio modules 56, 58. The readers 50 may each further comprise sensors 60 to sense operating status of the reader 50, and light emitting diodes (LEDs) 62 to visually indicate the operating status of the reader 50.

Multiple connections for solar panels 52 may be included to allow the option of adding additional solar panels 52 in case a single solar panel 52 does not capture sufficient solar power. Additionally or alternatively, the reader 50 may be connected to mains power (eg, using a USB port) thereby allowing alternative power configurations.

The batteries 54 may be 3.7V to 4.2V battery cells arranged in parallel to avoid having to balance power which would be required if they were arranged in series. This configuration makes it easier for charging and increases longevity of the circuit.

The UHF radio transceiver 56 may comprise a Nordic nRF wireless transceiver that operates as a receiver at all times, and the low frequency radio 58 may comprise an Xbee-PRO radio that operates as a transmitting radio.

The sensors 60 may, for example, comprise humidity and temperature sensors to identify leaks or potential damage within the reader 50. The LEDs 62 may visually indicate signal transmission, errors, etc. Plugs may be provided to optionally connect external sensors, etc.

Figures 15, 16:
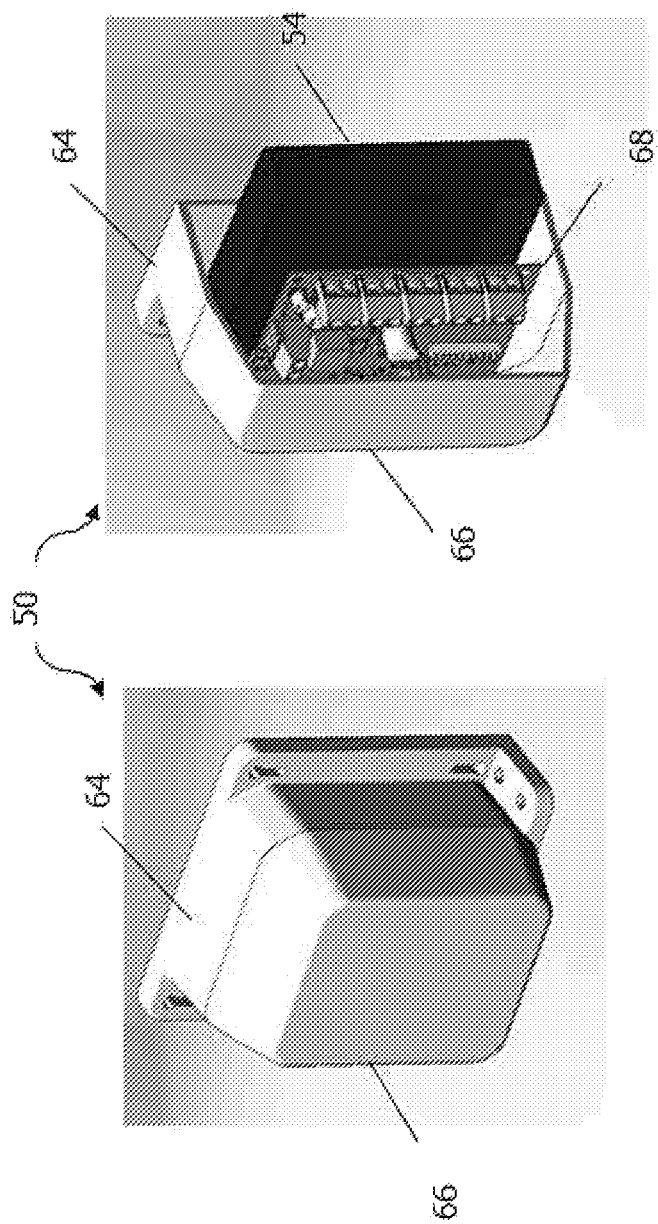
FIGS. 15 and 16 are full and partial perspective views of the reader.

Referring to FIGS. 15 and 16, the readers 50 may each generally comprise a housing 64 adapted to be attachable to a stationary location or stationary object (eg, a fence or gate), and a housing cover 66. The batteries 54, high frequency radio transceiver 56, low frequency radio 58, and sensors 60 may be provided on a circuit board 68 housed in the housing 64.

Figure 10:
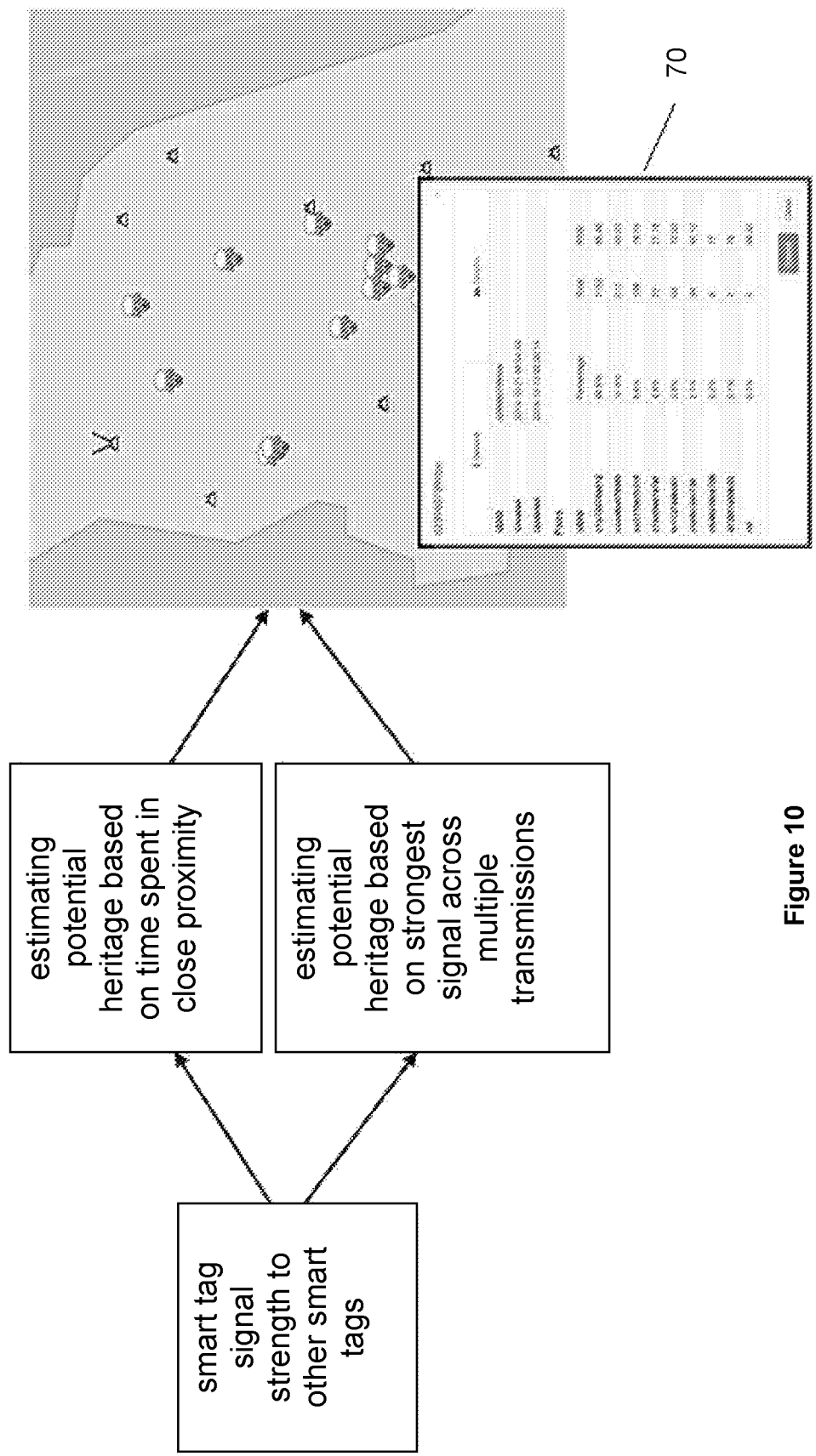
Figure 11:
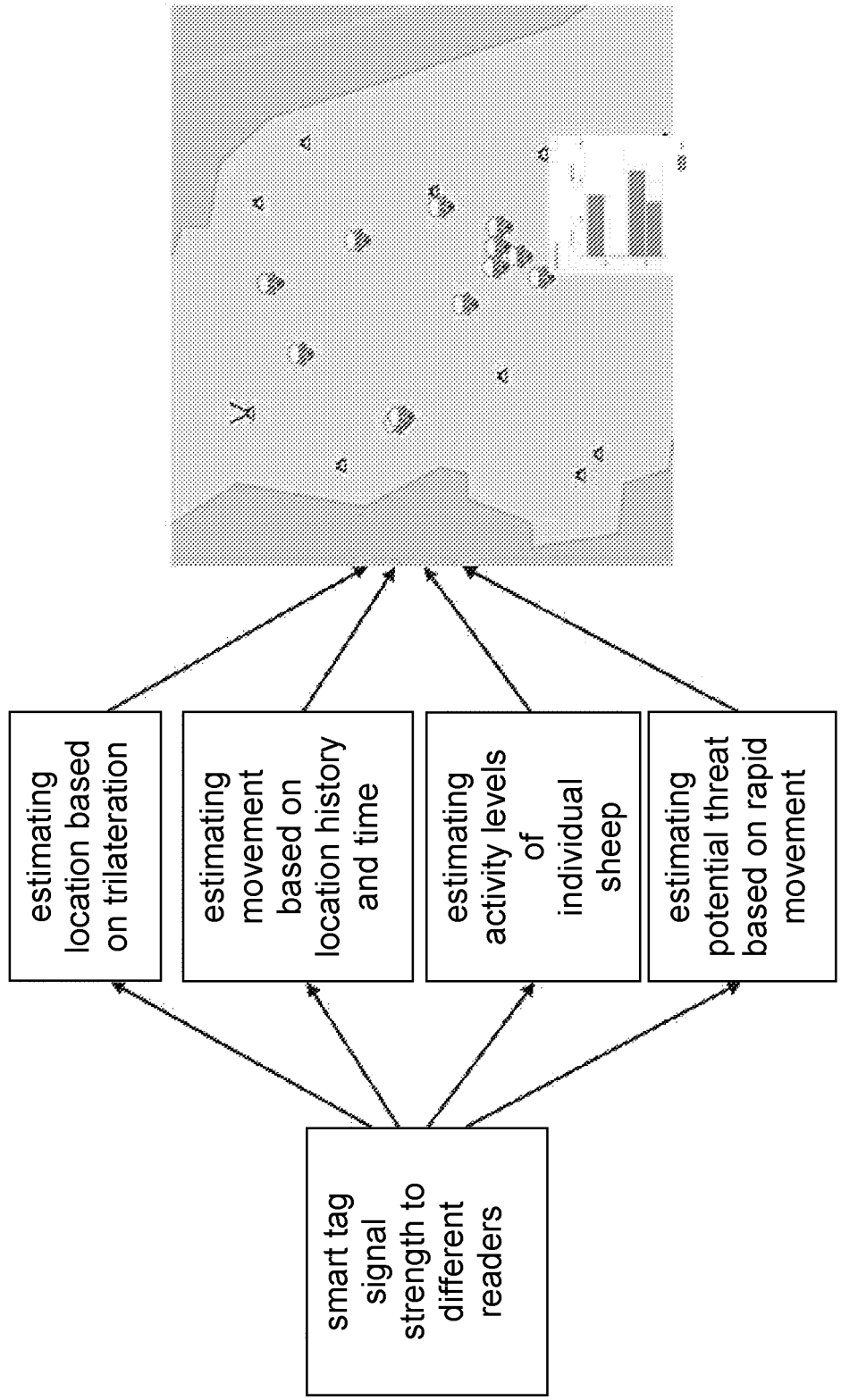

The server may comprise a cloud database server or a local server. Referring to FIGS. 10 and 11, the server may be configured to receive and store data from the gateway 80 and to transform the raw or cleaned data to generate information related to monitoring of the movable objects. The server may be programmed to clean the data received from the gateway to remove incomplete or erroneous data. In certain embodiments, the movable objects may comprise animals, such as livestock, for example sheep, cattle, pigs, goats, horses, etc. The server may be programmed to allow analysis of the data to provide animal monitoring functionality or services. For example, the server may be configured to provide animal monitoring functionality or services comprising monitoring animal characteristics, animal behavior, animal location, animal movement, animal activity, animal environment, proximity between animals, and combinations thereof.

The server may use User Datagram Protocol (UDP) internet transmission (ie, one-way data communication) to minimise bandwidth requirements. This may comprise a data stream (along with all transmission within the system) that does not send acknowledgment of receipt.

The server may be configured to individually monitor the animals based at least in part on the tag IDs and signal strengths of the paired tags 20 and/or the IDs of the readers 50.

For example, as illustrated in FIG. 10, the server may be configured to determine frequency and duration of incidences of proximity between the animals to generate one or more proximity profiles based at least in part on the tag IDs and signal strengths of the paired RF transceiver tags. For example, the server may be configured to generate a table 70 displaying the one or more frequency profiles of ewes and lambs. The table 70 may show the percentage and total number of pairings between the tags 20, together with the average signal strengths of the paired tags 20, across multiple transmissions. The frequency of proximity between the animals may be used to infer familial, social or genetic relationships between the animals. For example, the frequency of proximity may be used to estimate potential heritage of lambs.

Referring to FIG. 11, the server may be further or alternatively configured to determine proximity of the animals to the locations of the readers 50 based at least in part on trilateration of the reader IDs and the tag IDs. The locations may define a monitoring area for the animals.

Embodiments of the low power, long range wireless system 10 may be configured to provide different animal monitoring functionality or services such as:

- heritage/parentage identification;
- stock theft monitoring (eg, based on presence or absence of tags 20);
- health and welfare monitoring such as fly strike/breach strike;
- feed or water on offer (ie, the amount of feed in specific areas of paddocks or availability of water at water sights);
- virtual fencing/herding;
- wild dog, fox or other predator attacks (eg, based on rapid movement and/or clustering of tags 20)
- reproductive activity monitoring.

Additionally, the tags 20 may be differently configured for different animals. For example, the embodiment of the tag 20 described above and illustrated in FIGS. 12 and 13 may be suitable to monitor mature animals, such as ewes. An alternative embodiment of the tag 20 (not shown) may comprise a low cost, short use tag 20 suitable to monitor lambs. The differences between embodiments of the lamb tags 20 and the ewe tags 20 may, for example, comprise:

- lamb tags 20 may be contained in different style of packaging or housing, and may sit on or be attachable to the animal in a different place (eg, lamb tags 20 may be packaged in a more compact detachable waterproof case which sits around a lamb's neck);
- the power source for the lamb tags 20 may be batteries instead of the solar panel 22 and the super capacitor 26; and
- the lamb tags 20 may have reduced range of transmission and be transmission-only devices (ie, they may not switch into receiver mode).

Embodiments of the present invention provide long range wireless systems that are low cost, low weight and low power, and which are useful for monitoring geographically dispersed animals, such as sheep or cattle.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A tag attachable to an animal, the tag comprising:
   a battery connected to a radio transceiver that consumes power from the battery during transmissions and receptions of signals to and from one or more proximate tags attachable to one or more other animals to generate paired tag readings; and
   a controller configured to operate the radio transceiver for a predetermined duration and frequency of transmissions, and a predetermined duration and frequency of receptions;
   wherein the predetermined duration and frequency of transmissions and the predetermined duration and frequency of receptions are based on power consumptions of the radio transceiver during transmissions and receptions, and a targeted number of paired tag readings of the tag.

2. The tag of claim 1, wherein the animal is a sheep.

3. The tag of claim 1, wherein the predetermined duration and frequency of transmissions are around 1 to 5 nanoseconds every 10 seconds.

4. The tag of claim 3, wherein the predetermined duration and frequency of receptions are around 10 seconds every 10 minutes.

5. The tag of claim 4, wherein the targeted number of paired tags readings of the tag is 100 per day.

\* \* \* \* \*